(12) United States Patent
Hillberg et al.

(10) Patent No.: US 9,657,709 B2
(45) Date of Patent: May 23, 2017

(54) METHOD FOR USING AN ELECTRIC UNIT

(71) Applicant: ABB TECHNOLOGY AG, Zurich (CH)

(72) Inventors: Claes Hillberg, Moehlin (CH); Georg Traxler-Samek, Hallwil (CH); Peter Steimer, Ehrendingen (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/384,128

(22) PCT Filed: Mar. 11, 2013

(86) PCT No.: PCT/EP2013/054870
§ 371 (c)(1),
(2) Date: Sep. 9, 2014

(87) PCT Pub. No.: WO2013/132103
PCT Pub. Date: Sep. 12, 2013

(65) Prior Publication Data
US 2015/0035499 A1  Feb. 5, 2015

(30) Foreign Application Priority Data

Mar. 9, 2012 (EP) .................................... 12158786

(51) Int. Cl.
*H02J 1/00* (2006.01)
*H02J 3/00* (2006.01)
(Continued)

(52) U.S. Cl.
CPC ............. *F03B 13/06* (2013.01); *F01D 19/00* (2013.01); *H02H 3/02* (2013.01); *H02H 7/04* (2013.01);
(Continued)

(58) Field of Classification Search
CPC ........................................................ H02H 3/00
(Continued)

(56) References Cited

U.S. PATENT DOCUMENTS 3,846,698 A * 11/1974 Lawton ................. H01F 27/402
                                                          324/102
4,786,852 A    11/1988 Cook
(Continued)

FOREIGN PATENT DOCUMENTS

CN        1917348 A     2/2007
CN      201584856 U     9/2010
(Continued)

OTHER PUBLICATIONS

International Search Report (PCT/ISA/210) mailed on Feb. 19, 2014, by the European Patent Office as the International Searching Authority for International Application No. PCT/EP2013/054862.
(Continued)

*Primary Examiner* — Tulsidas C Patel
*Assistant Examiner* — Thomas Quigley
(74) *Attorney, Agent, or Firm* — Taft Stettinius & Hollister LLP

(57) ABSTRACT

A power plant, and a method for using an electrical unit therefor are disclosed, wherein, an electrical machine can be connected to a power network via a converter and a block transformer. A method is disclosed for using the electrical unit, wherein the converter disconnects the block transformer from the machine in the event of a malfunction of the block transformer.

2 Claims, 1 Drawing Sheet

(51) Int. Cl.

| | | |
|---|---|---|
| F03B 13/06 | (2006.01) | |
| H02P 27/14 | (2006.01) | |
| H02H 7/04 | (2006.01) | |
| H02M 7/483 | (2007.01) | |
| H02P 1/52 | (2006.01) | |
| H02J 3/42 | (2006.01) | |
| H02J 3/36 | (2006.01) | |
| H02K 7/18 | (2006.01) | |
| H02P 9/00 | (2006.01) | |
| H02P 25/022 | (2016.01) | |
| H02H 3/02 | (2006.01) | |
| F01D 19/00 | (2006.01) | |
| H02P 9/04 | (2006.01) | |
| H02P 9/08 | (2006.01) | |
| H02P 25/024 | (2016.01) | |

(52) U.S. Cl.
CPC ...... *H02J 3/36* (2013.01); *H02J 3/42* (2013.01); *H02K 7/1807* (2013.01); *H02M 7/483* (2013.01); *H02P 1/52* (2013.01); *H02P 9/00* (2013.01); *H02P 9/04* (2013.01); *H02P 9/08* (2013.01); *H02P 25/022* (2013.01); *H02P 25/024* (2016.02); *H02P 27/14* (2013.01); *Y02E 60/17* (2013.01); *Y02P 80/116* (2015.11)

(58) Field of Classification Search
USPC .......................................... 290/44, 55; 322/8
See application file for complete search history.

(56) References Cited

U.S. PATENT DOCUMENTS

| | | | |
|---|---|---|---|
| 4,952,852 A | 8/1990 | Bando et al. | |
| 5,015,941 A | 5/1991 | Dhyanchand | |
| 5,864,183 A | 1/1999 | Fisher, Jr. et al. | |
| 2005/0237678 A1* | 10/2005 | Virtanen ............... | H02M 1/32 361/18 |
| 2010/0133816 A1 | 6/2010 | Abolhassani et al. | |
| 2011/0002149 A1 | 1/2011 | Hiller et al. | |
| 2014/0001759 A1* | 1/2014 | Gupta ..................... | F03D 9/003 290/44 |

FOREIGN PATENT DOCUMENTS

| | | |
|---|---|---|
| DE | 10044261 A1 | 4/2002 |
| DE | 10 2004 005191 A1 | 9/2005 |
| DE | 10 2008 007659 A1 | 2/2009 |
| EP | 0 303 171 A2 | 2/1989 |
| WO | WO 2005/073550 A1 | 8/2005 |

OTHER PUBLICATIONS

International Search Report (PCT/ISA/210) mailed on Jun. 6, 2013, by the European Patent Office as the International Searching Authority for International Application No. PCT/EP2013/054870.
International Search Report (PCT/ISA/210) mailed on Mar. 19, 2014, by the European Patent Office as the International Searching Authority for International Application No. PCT/EP2013/054884.
International Search Report (PCT/ISA/210) mailed on May 15, 2014, by the European Patent Office as the International Searching Authority for International Application No. PCT/EP2013/054857.
Korn et al., "Low Output Frequency Operation of the Modular Multi-Level Converter", Energy Conversion Congress and Exposition, Sep. 12, 2010, pp. 3993-3997.
Ng et al., "A Multilevel Modular Converter for a Large, Light Weight Wind Turbine Generator", IEEE Transactions on Power Electronics, May 1, 2008, pp. 1062-1074, vol. 23, No. 3.
Happoldt et al., "The Present State of Pumped Storage in Europe", IEEE Transactions on Power Apparatus and Systems, Oct. 1, 1963, pp. 618-631, vol. 82, No. 68.
International Preliminary Examination Report on Patentability (Forms PCT/IB/373) and the Written Opinion of the International Searching Authority (Form PCT/ISA/237) issued on Sep. 9, 2014, by the International Bureau of WIPO in corresponding International Application No. PCT/EP2013/054870. (6 pages).
International Preliminary Examination Report on Patentability (Forms PCT/IB/373) and the Written Opinion of the International Searching Authority (Form PCT/ISA/237) issued on Sep. 9, 2014, by the International Bureau of WIPO in corresponding International Application No. PCT/EP2013/054862. (13 pages).
International Preliminary Examination Report on Patentability (Forms PCT/IB/373) and the Written Opinion of the International Searching Authority (Form PCT/ISA/237) issued on Sep. 9, 2014, by the International Bureau of WIPO in corresponding International Application No. PCT/EP2013/054884. (11 pages).
International Preliminary Examination Report on Patentability (Forms PCT/IB/373) and the Written Opinion of the International Searching Authority (Form PCT/ISA/237) issued on Sep. 9, 2014, by the International Bureau of WIPO in corresponding International Application No. PCT/EP2013/054857. (5 pages).
English Translation of Chinese Office Action; Chinese Application No. 201380013138.9; Jun. 17, 2016; ABB Technology AG; 5 pgs.
English Translation of Chinese Search Report; Chinese Application No. 201380013138.9; ABB Technology AG; May 31, 2016; 3 pgs.

* cited by examiner

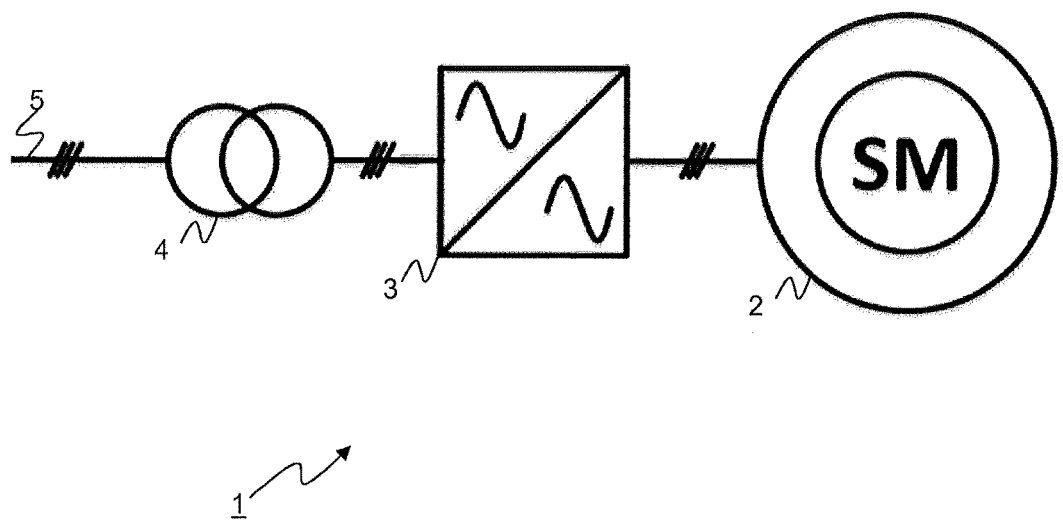

METHOD FOR USING AN ELECTRIC UNIT

TECHNICAL FIELD

The invention relates to a power plant, in particular to a method for using an electric unit therefor, comprising an electric machine, a frequency converter and a generator transformer, wherein the machine is connectable to an electric grid via the converter and the generator transformer.

PRIOR ART

Modern power plant technology makes it possible to configure a power plant to be more efficient. In some power plants, such as wind power plants and pumped-storage power plants, for example, provision is made for an electric machine to be connected directly to a converter.

Modern pumped-storage power plants or pumped stores have, for example, variable-speed drives. By decoupling the speed of the machines from a grid frequency, rotational speeds of the pumps and turbines can be set such that they are operated close to optimum efficiency. In addition, the variation in the speed during pump operation makes it possible to freely adjust the power consumption. In particular, systems with a variable speed can be connected to or synchronized with the grid quickly from a standstill.

Pumped stores in accordance with the prior art have double-fed asynchronous machines and power electronics converters, whereby speed regulation of a pump and a turbine is possible. Thus, firstly a pump power is regulated and secondly the efficiency of the system can be increased, if required.

In one embodiment for speed regulation of the pump or turbine, a synchronous machine whose stator is fed by means of a three-phase current with an adjustable frequency is used. The frequency conversion in this case is generated with the aid of a combination of a rectifier and an inverter, which are connected to one another via a voltage or current DC link.

Such an embodiment is an example in which an electric machine is connectable directly to a converter such as a frequency converter. In principle, it is also conceivable for other power plants to be configured in such a way that the electric machine is connectable directly to a converter.

At the high powers in a power plant, very high generator currents occur, which cannot be transmitted between the power plant and the consumers since losses along a line increase quadratically with the current owing to the electrical resistance. Therefore, a generator transformer, also referred to as machine transformer, is often provided, which sets a generator voltage to, for example, a voltage which is much higher and is conventional in a high-voltage grid, wherein the current will become correspondingly lower.

In order to protect the generator transformer in a power plant, a generator switch or generator circuit breaker is often also provided. This disconnects the machine, operating as a generator, from the generator transformer in the event of an emergency, for example in the case of an operational fault of the generator transformer, and protects the generator transformer from high short-circuit currents, which have an effect on the generator transformer in the event of a malfunction on the machine side. If said generator transformer is only disconnected from the grid, but not from the machine, the machine continues to feed the defective generator transformer, which can possibly result in explosion of the generator transformer.

In this case, a generator switch is complex and cost-intensive in terms of manufacture and maintenance since it needs to switch under extreme conditions in order to disconnect the machine from the generator transformer in the event of an emergency.

Against this background, the present invention is based on the object of simplifying a power plant and configuring it to be more efficient.

DESCRIPTION OF THE INVENTION

This object is achieved by a method for using an electric unit for a pumped-storage power plant as claimed in claim 1. Further advantageous configurations result from the dependent claims, wherein the back-references in the claims do not exclude any other sensible combinations of claims.

In this case, the invention provides a method for using an electric unit for a power plant, for example a pumped-storage power plant, a wind power plant or a coal-fired power plant. The electric unit comprises an electric machine, for example a variable-speed or constant-speed machine, a frequency converter and a generator transformer or machine transformer, wherein the machine is connectable to an electric grid via the frequency converter and the transformer. The method provides for the frequency converter to disconnect the generator transformer from the machine by opening active switching elements such as, for example, transistors or thyristors, in the event of an operational fault such as a malfunction of the generator transformer or in the event of an emergency.

By virtue of the use of the frequency converter as a disconnector, a generator switch can be saved. As a result, costs in terms of manufacture and maintenance of the electric unit are reduced.

BRIEF DESCRIPTION OF THE DRAWINGS

Further features, details and advantages of the invention result from the wording of the claims and from the description of exemplary embodiments on the basis of the FIGURE.

The invention will be explained in more detail on the basis of the following text with reference to preferred exemplary embodiments using the FIGURE, in which FIG. 1 shows a schematic illustration of an electric unit comprising an electric machine and comprising a converter connected to an electric grid via a generator transformer.

The reference symbols and the significance thereof are summarized in the list of reference symbols. In general, the same reference symbols denote the same parts.

DETAILED DESCRIPTION OF EXEMPLARY EMBODIMENTS

FIG. 1 shows a schematic illustration of an electric unit 1 comprising an electric machine 2 and a converter 3 connected to an electric grid 5 via a generator transformer 4. The machine 2 is used as motor or generator depending on a mode of operation of the machine 2.

A frequency conversion is produced by means of a combination of a rectifier and an inverter, which are connected to one another via a concentrated or distributed voltage DC link or current DC link. The DC link in this case furthermore has units for energy storage, for example capacitors in the case of a voltage DC link and inductances in the case of a current DC link.

Given a suitable design of the grid-side rectifier or inverter, also referred to as ARU, and machine-side rectifier or inverter, also referred to as INU, fault cases occurring in the generator transformer 4, which would result in high short-circuit currents, can be managed safely since the machine 2 is decoupled from the generator transformer 4 by the converter 3.

The operation of the machine with a freely selectable speed has considerable advantages in various applications. Using the example of pumped-storage power plants, by decoupling the speed of the machines from a grid frequency, pump and turbine rotation speeds can be set in such a way that they are operated close to optimum efficiency. In addition, this enables the speed to be varied during pump operation and the power consumption to be set freely. By virtue of the use of the synchronous machine 2, in particular high speeds can also be achieved for high drops, for example. Furthermore, the speed range which can be achieved during operation continuously ranges from zero to the maximum speed and is only restricted by the operational limits of the pump and the turbine. The pump and the turbine can in principle be combined in one unit, for example a pump turbine. In particular, there is the possibility of retrofitting older systems for variable frequency operation without replacing the existing generator. A further advantage consists in very quick grid coupling and the possibility of generating positive and negative reactive power in the converter 3 in order that the generator can be operated exclusively with active power, as a result of which said generator has a more compact design. Furthermore, owing to the use of the converter 3, it is possible to switch over quickly from pump to turbine operation, for example.

In particular, reliable and low-maintenance synchronous generator technology established by the embodiment according to the invention can be used.

LIST OF REFERENCE SYMBOLS

1 Electric unit
2 Machine
3 Converter
4 Generator transformer
5 Electric grid

The invention claimed is:

1. A method for using an electric unit for a power plant, wherein the electric unit includes a synchronous electric machine which can operate as a motor and a generator, a converter having active switching elements, and a generator transformer, wherein the machine configured for connection to an electric grid via the converter and the generator transformer and a stator of the synchronous electric machine is fed with a three-phase current with an adjustable frequency, the adjustable frequency being generated by the converter, the method comprising the following step:

disconnecting a connection between the machine and the generator transformer in an event of a malfunction of the generator transformer during generator operation of the electric machine by opening the active switching elements of the converter;

wherein a generator switch or generator circuit breaker is not provided for disconnecting the machine from the generator transformer in the event of an emergency, the active switching elements of the converter thereby being opened to prevent the malfunction of the generator transformer from causing an explosion of the generator transformer.

2. The method according to claim 1, wherein the active switching elements are transistors or thyristors.

* * * * *